United States Patent
Hirako

(10) Patent No.: US 9,227,593 B2
(45) Date of Patent: Jan. 5, 2016

(54) ANCHOR PLATE MOUNTING STRUCTURE OF VEHICLE SEATBELT

(71) Applicant: Toyota Jidosha Kabushiki Kaisha, Toyota-shi Aichi-ken (JP)

(72) Inventor: Yutaka Hirako, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/332,880

(22) Filed: Jul. 16, 2014

(65) Prior Publication Data

US 2015/0021895 A1 Jan. 22, 2015

(30) Foreign Application Priority Data

Jul. 17, 2013 (JP) ................................. 2013-148767

(51) Int. Cl.
*B60R 22/26* (2006.01)
(52) U.S. Cl.
CPC ....................................... *B60R 22/26* (2013.01)
(58) Field of Classification Search
CPC ....................................................... B60R 22/26
USPC ....................................................... 280/801.1
See application file for complete search history.

(56) References Cited

U.S. PATENT DOCUMENTS

| 648,505 | A | * | 5/1900 | Lindbohm | 43/18.1 R |
|---|---|---|---|---|---|
| 2,855,215 | A | * | 10/1958 | Sheren | 280/801.1 |
| 4,397,482 | A | * | 8/1983 | Ogawa et al. | 280/802 |
| 4,611,854 | A | * | 9/1986 | Pfeiffer | 297/468 |
| 4,676,555 | A | * | 6/1987 | Tokugawa | 297/473 |
| 4,676,556 | A | * | 6/1987 | Yamanoi et al. | 297/473 |
| 4,682,790 | A | * | 7/1987 | Katsuno et al. | 280/801.1 |
| 4,824,175 | A | * | 4/1989 | Tokugawa | 297/473 |
| 5,020,856 | A | * | 6/1991 | George | 297/483 |
| 6,267,410 | B1 | * | 7/2001 | Koketsu et al. | 280/801.1 |
| 2002/0190518 | A1 | * | 12/2002 | Kang | 280/801.1 |
| 2008/0296881 | A1 | * | 12/2008 | Richter et al. | 280/801.1 |
| 2009/0243262 | A1 | * | 10/2009 | Itoga | 280/728.2 |
| 2012/0212029 | A1 | * | 8/2012 | Wada | 297/479 |
| 2014/0217804 | A1 | * | 8/2014 | Maemura et al. | 297/474 |

FOREIGN PATENT DOCUMENTS

| JP | 02-126962 U | 10/1990 |
|---|---|---|
| JP | 10-203305 A | 8/1998 |
| JP | 2000-095060 A | 4/2000 |
| JP | 2000304430 A * | 11/2000 |
| JP | 2007-161206 A | 6/2007 |
| JP | 2012-224294 A | 11/2012 |

* cited by examiner

*Primary Examiner* — Paul N Dickson
*Assistant Examiner* — Darlene P Condra
(74) *Attorney, Agent, or Firm* — Dinsmore & Shohl LLP

(57) ABSTRACT

An anchor plate mounting structure of a vehicle seatbelt includes an anchor plate that is provided on a mounting portion provided on a surrounding portion of a vehicle seat, and has a belt connecting portion to which an end portion of a lap belt of the vehicle seatbelt, the lap belt corresponding to a waist of an occupant, is fastened; a fastening portion that is provided in a position away from the belt connecting portion, and by which the anchor plate is fastened to the mounting portion; and a rotation-stopping portion that is provided in a position away from both the belt connecting portion and the fastening portion, and by which the anchor plate engages with a mounting portion side. An alignment direction of the belt connecting portion and the fastening portion intersects with an alignment direction of the fastening portion and the rotation-stopping portion.

11 Claims, 5 Drawing Sheets

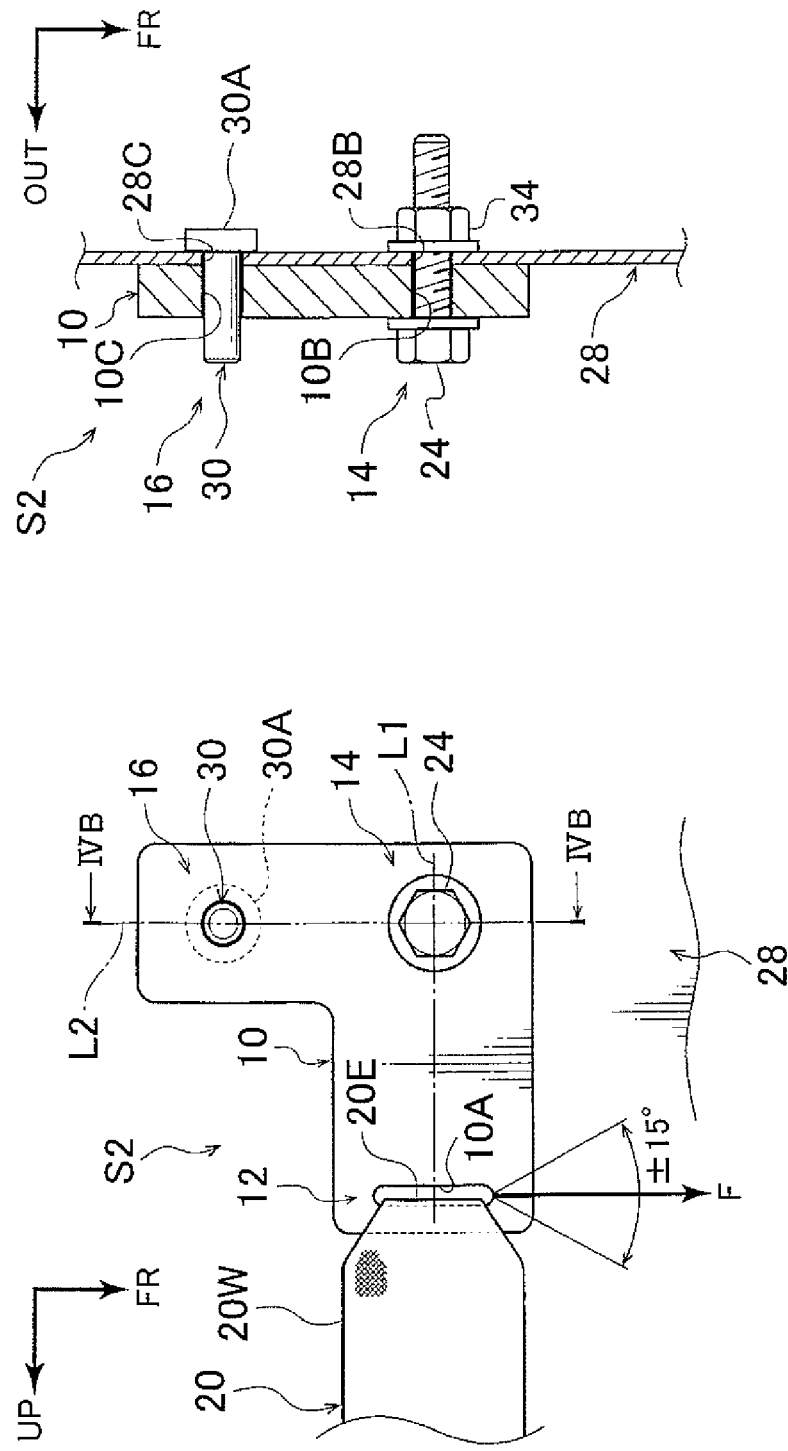

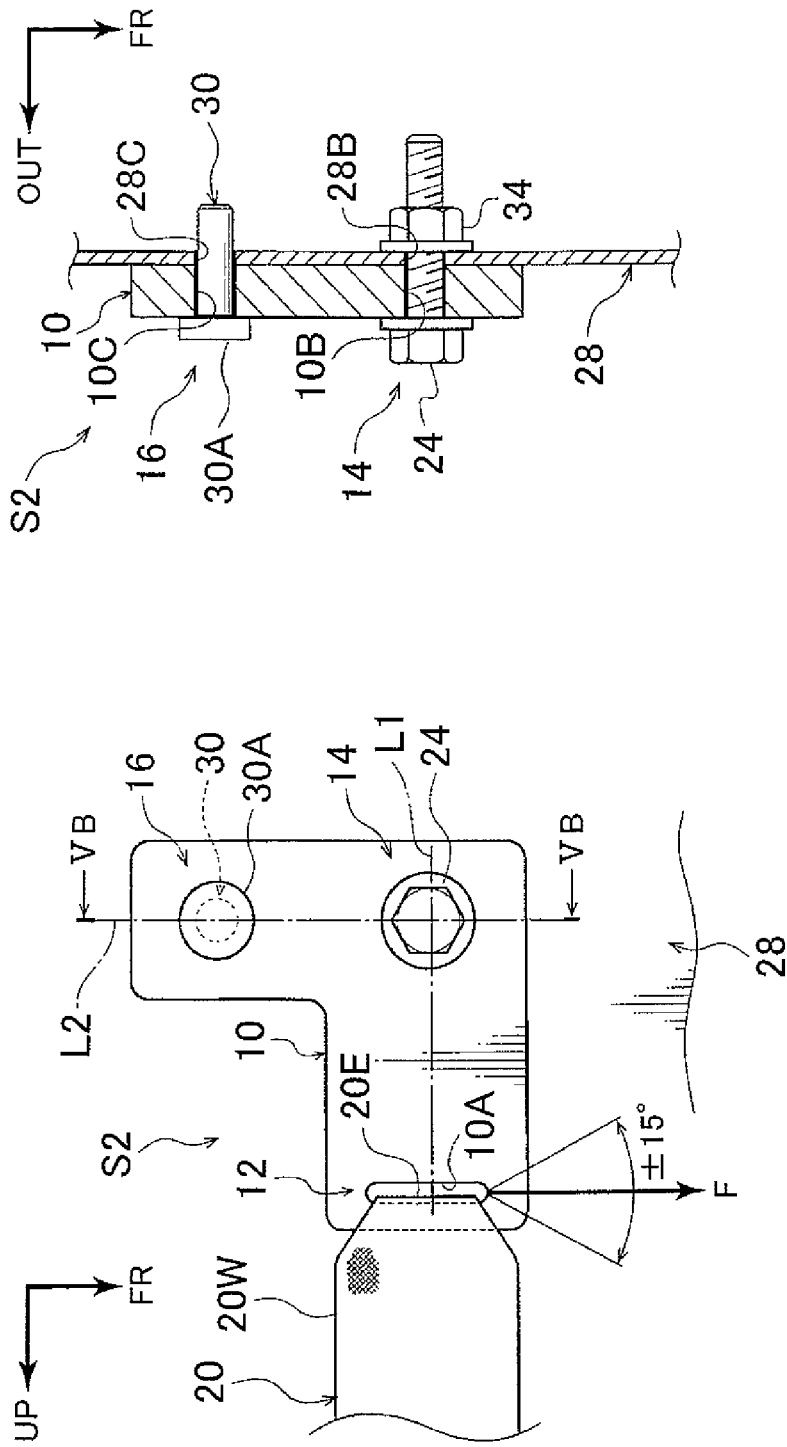

US 9,227,593 B2

ANCHOR PLATE MOUNTING STRUCTURE OF VEHICLE SEATBELT

INCORPORATION BY REFERENCE

The disclosure of Japanese Patent Application No. 2013-148767 filed on Jul. 17, 2013 including the specification, drawings and abstract is incorporated herein by reference in its entirety.

BACKGROUND OF THE INVENTION

1. Field of the Invention

The invention relates to an anchor plate mounting structure of a vehicle seatbelt.

2. Description of Related Art

Japanese Patent Application Publication No. 10-203305 (JP 10-203305 A) describes a structure that stops a seatbelt anchor from rotating, by a protruding bead formed bent upward on a portion of a floor panel of a vehicle.

However, in the example described above, it is possible that an anchor plate may end up riding over the protruding bead due to a load input to the anchor plate at the time of a vehicle collision. If the anchor plate rotates, the position of a connecting point on the anchor plate where a lap belt is connected will change. As a result, a load (tension) on the lap belt from an occupant may temporarily decrease, and the amount of movement of the waist of the occupant may increase.

SUMMARY OF THE INVENTION

The invention thus provides an anchor plate mounting structure of a vehicle seatbelt that increases an impact absorption amount by a lap belt, by inhibiting an amount of movement of the waist of an occupant when a vehicle collision occurs.

One aspect of the invention relates to an anchor plate mounting structure of a vehicle seatbelt. This anchor plate mounting structure includes an anchor plate that is provided on a mounting portion provided on a surrounding portion of a vehicle seat, and has a belt connecting portion to which an end portion of a lap belt of the vehicle seatbelt, the lap belt corresponding to a waist of an occupant, is fastened; a fastening portion that is provided in a position away from the belt connecting portion, and by which the anchor plate is fastened to the mounting portion; and a rotation-stopping portion that is provided in a position away from both the belt connecting portion and the fastening portion, and by which the anchor plate engages with a mounting portion side. An alignment direction of the belt connecting portion and the fastening portion intersects with an alignment direction of the fastening portion and the rotation-stopping portion.

In this aspect, the anchor plate is fastened to the mounting portion at the fastening portion, and the lap belt is connected to the belt connecting portion of the anchor plate. The rotation-stopping portion that engages with the mounting portion side is provided in a position away from both the belt connecting portion and the fastening portion. The alignment direction of the belt connecting portion and the fastening portion intersects with the alignment direction of the fastening portion and the rotation-stopping portion. Therefore, when a load is input from the waist of the occupant to the anchor plate via the lap belt when a vehicle collision occurs, the anchor plate is inhibited from rotating around the fastening portion by the moment from this load. Therefore, the amount of movement of the waist of the occupant when a vehicle collision occurs is able to be suppressed, so the impact absorption amount by the lap belt is able to be increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is an enlarged side view of one example of an anchor plate mounting structure of a vehicle seatbelt according to a second example embodiment of the invention;

FIG. 4B is a sectional view taken along line IVB-IVB in FIG. 4A, of the anchor plate mounting structure of the vehicle seatbelt according to the second example embodiment of the invention;

FIG. 5A is an enlarged side view of another example of the anchor plate mounting structure of the vehicle seatbelt according to the second example embodiment of the invention; and FIG. 5B is a sectional view taken along line VB-VB in FIG. 5A, of the anchor plate mounting structure of the vehicle seatbelt according to the second example embodiment of the invention.

DETAILED DESCRIPTION OF EMBODIMENTS

Hereinafter, example embodiments of the invention will be described with reference to the accompanying drawings.

First Example Embodiment

Figure 1:
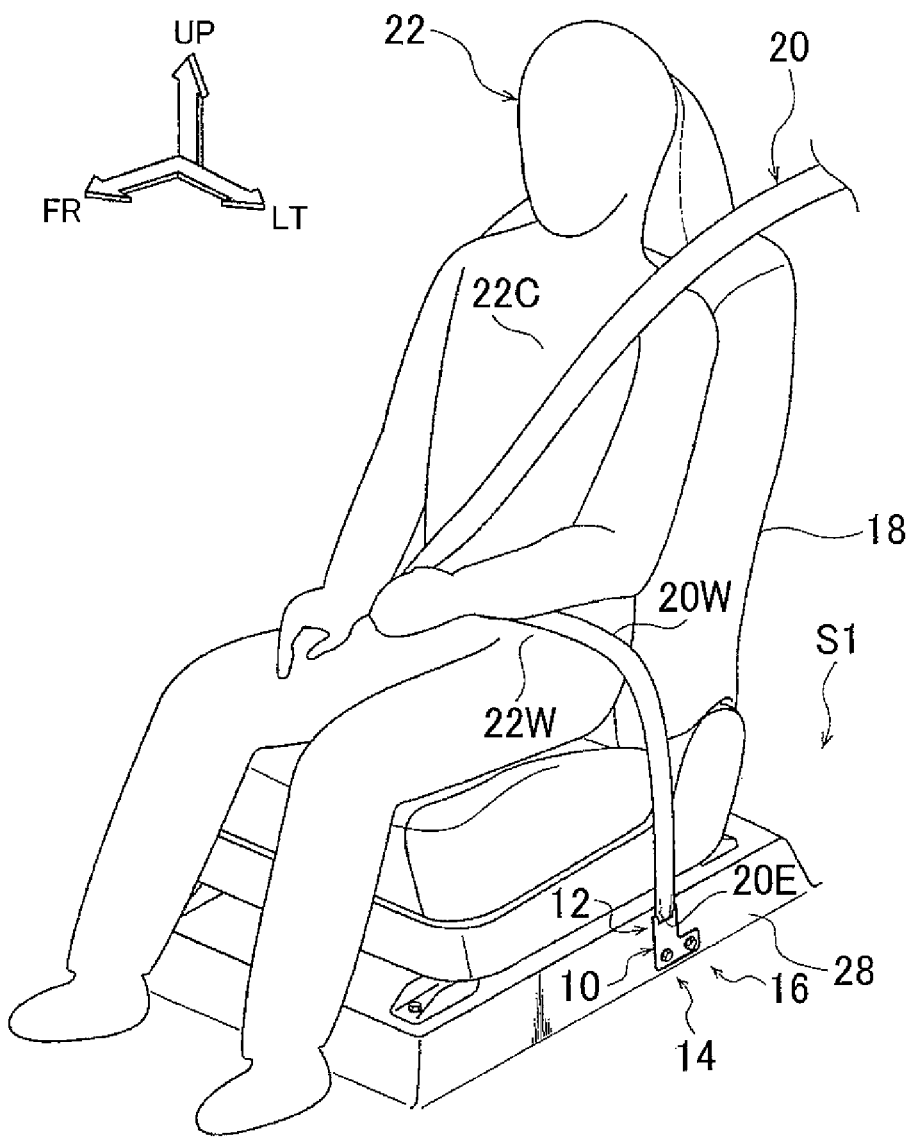
FIG. 1 is a perspective view of an anchor plate mounting structure of a vehicle seatbelt according to a first example embodiment of the invention.

An anchor plate mounting structure S1 of a vehicle seatbelt according to a first example embodiment of the invention includes an anchor plate 10, a fastening portion 14, and a rotation-stopping portion 16, as shown in FIG. 1.

A vehicle seatbelt 20 is webbing that restrains a waist 22W and a chest 22C of an occupant 22 seated in a vehicle seat 18 (e.g., a rear seat). A portion of the vehicle seatbelt 20, more specifically, a portion from an end portion 20E that is connected to the anchor plate 10 to a tongue plate, not shown, is a lap belt 20W that corresponds to the waist 22W of the occupant 22. The length of the lap belt 20W changes depending on the physical build of the occupant 22 wearing the vehicle seatbelt 20. In the example shown in the drawings, the anchor plate 10 is provided on the left side of the vehicle seat 18, and a buckle device, not shown, is provided on the right side of the vehicle seat 18. The tongue plate is detachably inserted into this buckle device, not shown.

Figure 2:
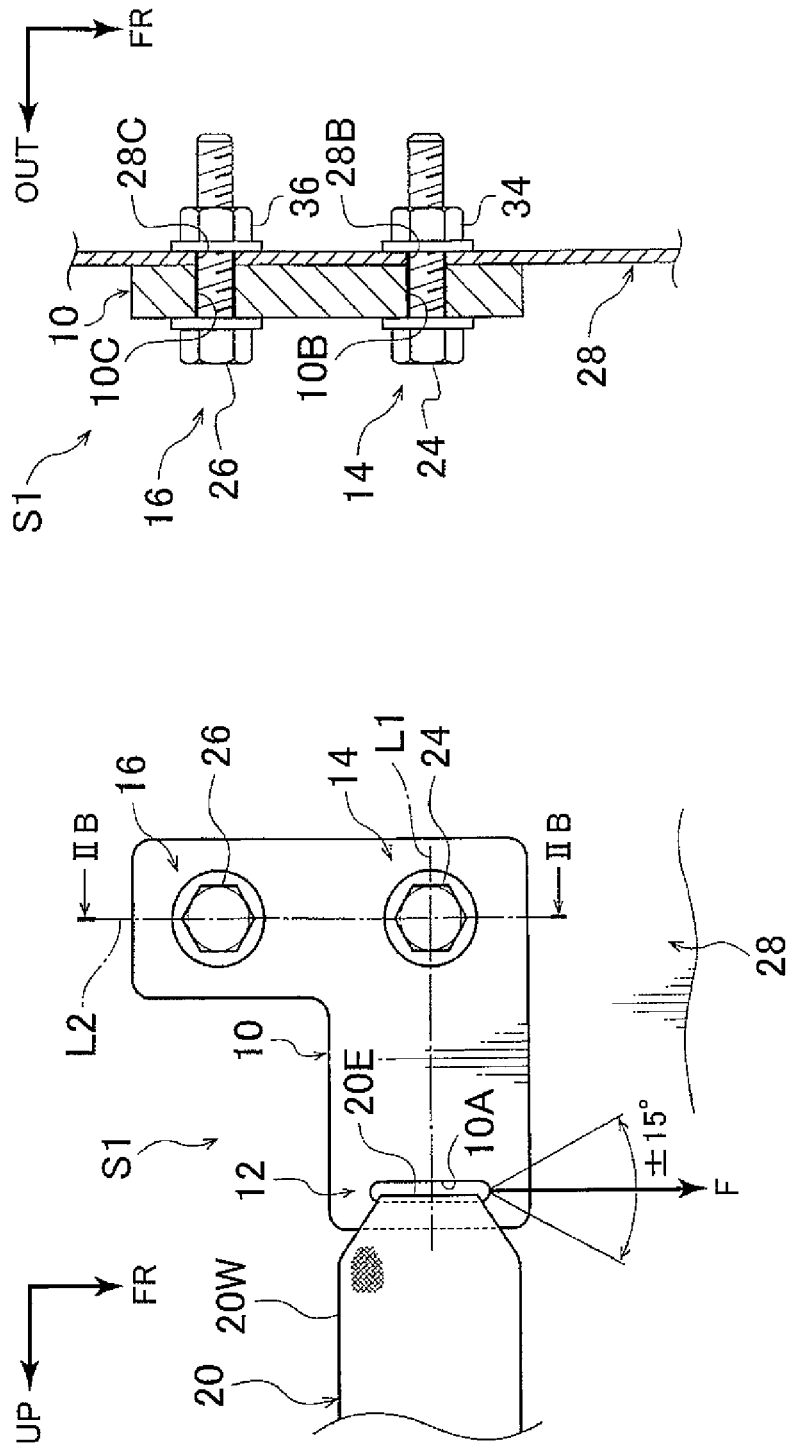
FIG. 2A is an enlarged side view of the anchor plate mounting structure of the vehicle seatbelt according to the first example embodiment of the invention.
FIG. 2B is a sectional view taken along line IIB-IIB in FIG. 2A, of the anchor plate mounting structure of the vehicle seatbelt according to the first example embodiment of the invention.

In FIG. 2A, the anchor plate 10 is provided on a floor panel 28 that serves as one example of a mounting portion provided on a surrounding portion of the vehicle seat 18. This anchor plate 10 has a belt connecting portion 12 to which an end portion 20E of the lap belt 20W is connected. That is, the anchor plate 10 is a member that connects the lap belt 20W to the floor panel 28, and is an L-shaped metal plate, for example. A through-hole 10A that forms the belt connecting portion 12, a through-hole 10B that forms the fastening portion 14, and a through-hole 10C that forms the rotation-stopping portion 16, are all formed in this anchor plate 10. As shown in FIG. 2A, the through-hole 10A of the belt connecting portion 12 and the through-hole 10C of the rotation-stopping portion 16 are provided one on each end of the L-shaped anchor plate 10, and the through-hole 10B of the fastening portion 14 is provided at a bent portion of the L-shaped anchor plate 10.

The belt connecting portion 12 is provided on the anchor plate 10 and is a portion to which the end portion 20E of the lap belt 20W is connected. The through-hole 10A that is slit-shaped, for example, is formed in this belt connecting portion 12. The lap belt 20W is passed through the through-hole 10A, folded back onto itself, and sewn to itself (i.e., the two overlapping portions of the lap belt 20W are sewn together). As a result, the end portion 20E of the lap belt 20W is formed in a loop that passes through the through-hole 10A. The structure of the belt connecting portion 12 is not limited to the slit-shaped through-hole 10A. The means for connecting the end portion 20E of the lap belt 20W to the anchor plate 10 is arbitrary.

In FIG. 2A, the fastening portion 14 is provided in a position away from the belt connecting portion 12, and is a portion by which the anchor plate 10 is fastened to the floor panel 28. More specifically, the fastening portion 14 is offset with respect to the belt connecting portion 12, in a direction intersecting a vehicle longitudinal direction, such as a vehicle up-and-down direction, for example. The direction of this offset may also be a vehicle width direction or the like. As shown in FIG. 2B, a bolt 24 and a nut 34, for example, may be used at the fastening portion 14. The nut 34 is fixed in advance by welding or the like to a back surface side of the floor panel 28 at the fastening portion 14. The bolt 24 is inserted through the through-hole 10B in the anchor plate 10, and a through-hole 28B in the floor panel 28, and fastened to the nut 34.

In FIG. 2A, the rotation-stopping portion 16 is provided in a position away from both the belt connecting portion 12 and the fastening portion 14, and is a portion by which the anchor plate 10 engages with the floor panel 28 side. The alignment direction of the belt connecting portion 12 and the fastening portion 14 intersects with the alignment direction of the fastening portion 14 and the rotation-stopping portion 16. As an example, when a straight line that connects the center of the belt connecting portion 12 with the connects the center of the fastening portion 14 with the center of the rotation-stopping portion 16 is denoted as a second axis L2, the first axis L1 is orthogonal to the second axis L2. The center of the belt connecting portion 12 is the center of the through-hole 10A (FIG. 2A) in the anchor plate 10. The center of the fastening portion 14 is the center of the through-hole 10B (FIG. 2B) in the anchor plate 10. The center of the rotation-stopping portion 16 is the center of the through-hole 10C (FIG. 2B) in the anchor plate 10. The intersection of the alignment directions of the belt connecting portion 12, the fastening portion 14, and the rotation-stopping portion 16 is not limited to being orthogonal.

As shown in FIG. 2A, the alignment direction of the fastening portion 14 and the rotation-stopping portion 16 (i.e., the second axis L2) is set parallel, for example, to the direction in which a load F that is input from the lap belt 20W to the belt connecting portion 12 when a vehicle collision occurs is applied. There is variation of ±15° in the direction in which the load F is applied, considering a small overlap collision (a frontal collision farther to the vehicle width direction outside than a front side member) and an oblique collision.

The rotation-stopping portion 16 is a structure in which the anchor plate 10 engages with a bolt 26 that serves as one example of a shaft member that is inserted through the anchor plate 10. The bolt 26 is a member for fastening the anchor plate 10 to the floor panel 28. A nut 36 is fixed in advance by welding or the like to a back surface side of the floor panel 28 at the rotation-stopping portion 16. The bolt 26 is inserted through the through-hole 10C in the anchor plate 10 and a through-hole 28C in the floor panel 28, and fastened to the nut 36. In this way, the rotation-stopping portion 16 has a structure similar to that of the fastening portion 14, in that it fastens the anchor plate 10 to the floor panel 28.

Figure 3:
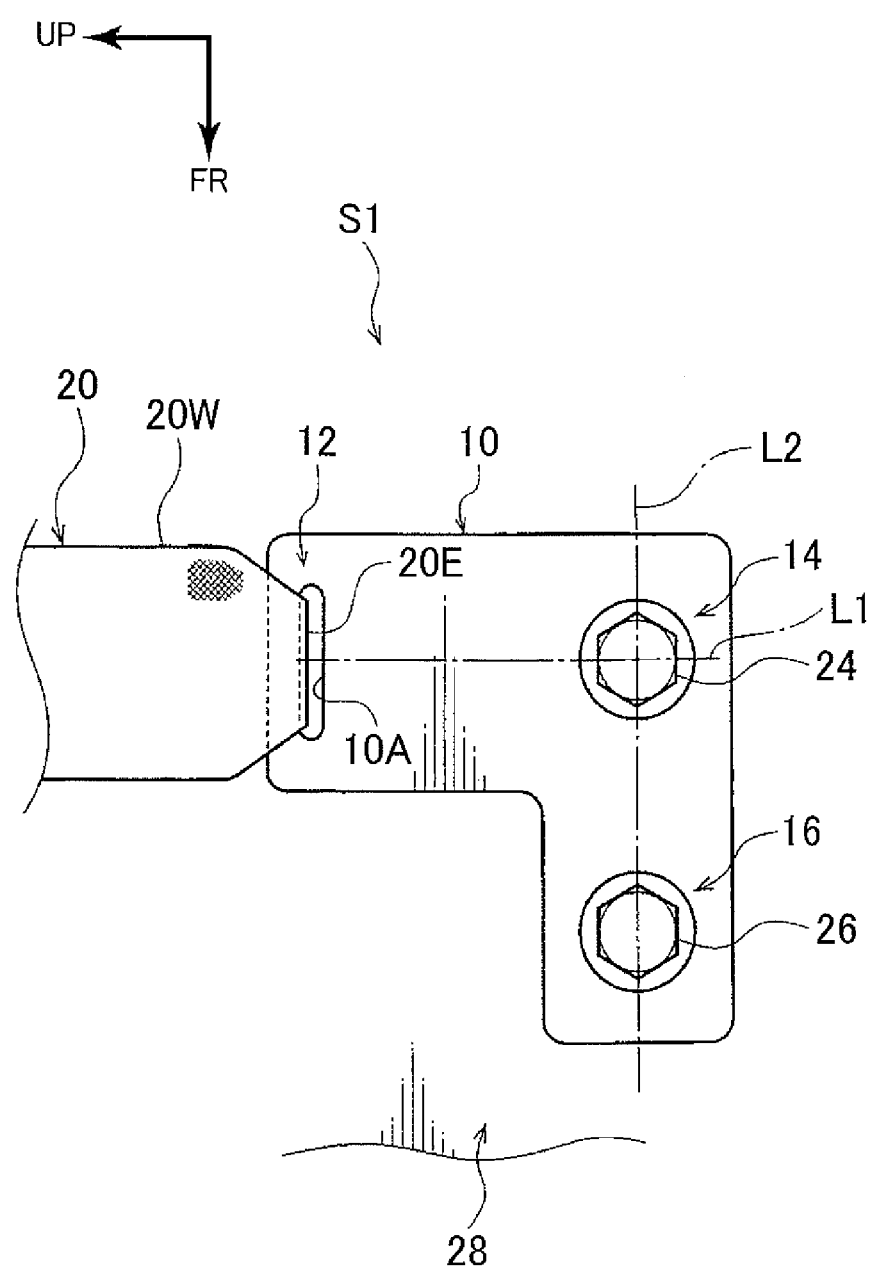
FIG. 3 is a side view of a modified example of the anchor plate mounting structure of the vehicle seatbelt according to the first example embodiment of the invention.

In FIG. 2B, the rotation-stopping portion 16 is offset to a vehicle rear side, for example, with respect to the fastening portion 14. The rotation-stopping portion 16 may also be offset to a vehicle front side with respect to the fastening portion 14, as in the modified example shown in FIG. 3.

Operation

The operation of the example embodiment structured as described above will now be described. With the anchor plate mounting structure S1 of the vehicle seatbelt according to this example embodiment, the rotation-stopping portion 16 that engages with the floor panel 28 side is provided in a position away from both the belt connecting portion 12 and the fastening portion 14, on the anchor plate 10, as shown in FIG. 2A. The alignment direction of the belt connecting portion 12 and the fastening portion 14 intersects with the alignment direction of the fastening portion 14 and the rotation-stopping portion 16. More specifically, the first axis L1 that connects the center of the belt connecting portion 12 with the center of the fastening portion 14 is orthogonal to the second axis L2 that connects the center of the fastening portion 14 with the center of the rotation-stopping portion 16. Therefore, when a load is input from the waist 22W of the occupant 22 to the anchor plate 10 via the lap belt 20W when a vehicle collision occurs, the anchor plate 10 is inhibited from rotating around the fastening portion 14 by the moment from this load. Therefore, the amount of movement of the waist 22W of the occupant 22 when a vehicle collision occurs is able to be suppressed, so the impact absorption amount by the lap belt 20W is able to be increased.

The second axis L2 is set parallel to the direction in which the load F that is input from the lap belt 20W to the belt connecting portion 12 when a vehicle collision occurs is applied. In other words, the rotation-stopping portion 16 and the fastening portion 14 are arranged lined up parallel to the direction in which the load F is applied. Therefore, an increase in the size of the anchor plate 10 in the direction of the first axis L1 due to the rotation-stopping portion 16 being provided is able to be suppressed, so the anchor plate 10 that has the rotation-stopping portion 16 is able to be arranged in the limited space of the floor panel 28.

Also, at the rotation-stopping portion 16, the anchor plate 10 is engaged with the bolt 26 that is a shaft member inserted through the anchor plate 10, so a special shape for engaging the anchor plate 10 with the floor panel 28 side does not need to be provided. Therefore, an increase in cost to provide the rotation-stopping portion 16 is able to be suppressed.

In addition, at the rotation-stopping portion 16, the anchor plate 10 is fastened to the floor panel 28 by the bolt 26 and the nut 36. That is, the anchor plate 10 is fastened to the floor panel 28 at the fastening portion 14 and the rotation-stopping portion 16. Therefore, the mounting rigidity of the anchor plate 10 is able to be increased.

Second Example Embodiment

With an anchor plate mounting structure S2 of a vehicle seatbelt according to a second example embodiment of the invention, the shaft member is a pin 30, as shown in FIGS. 4 and 5. In the example shown in FIG. 4B, the pin 30 is inserted through the through-hole 28C in the floor panel 28 and the through-hole 10C in the anchor plate 10 from the floor panel 28 side. The pin 30 may be fit into the through-hole 10C so that there is no gap between the pin 30 and the through-hole 10C. The pin 30 is a parallel pin, for example, and has a head portion 30A that is a large diameter portion. This head portion 30A abuts against the floor panel 28. The head portion 30A of the pin 30 is fixed to the floor panel 28 by welding or the like before the anchor plate 10 is attached to the floor panel 28.

On the other hand, in the example in FIG. 5B, the head portion 30A of the pin 30 is fixed to the anchor plate 10 by welding or the like before the anchor plate 10 is attached to the floor panel 28. Then the pin 30 is inserted through the through-hole 28C in the floor panel 28. The pin 30 may be fit into the through-hole 28C so that there is no gap between the pin 30 and the through-hole 28C.

The other portions are the same as they are in the first example embodiment, so like portions are denoted by like reference characters in the drawings, and descriptions of these portions are omitted.

Operation

The operation of the example embodiment structured as described above will now be described. In FIGS. 4 and 5, with the anchor plate mounting structure S2 of the vehicle seatbelt according to this example embodiment, the pin 30 that is the shaft member is inserted through the through-hole 10C in the anchor plate 10. Therefore, the anchor plate 10 is able to easily be engaged with the floor panel 28 side.

More specifically, in the example shown in FIG. 4, when attaching the anchor plate 10 to the floor panel 28, the pin 30 that protrudes from the floor panel 28 is inserted through the through-hole 10C. In the example shown in FIG. 5, when attaching the anchor plate 10 to the floor panel 28, the pin 30 that is fixed to the anchor plate 10 beforehand is inserted through the through-hole 28C in the floor panel 28. As a result, in either case, the anchor plate 10 is positioned with respect to the floor panel 28 as well as temporarily joined thereto, so the positioning of the through-holes 10B and 28B in the fastening portion 14 is easier, which makes the work of fastening the fastening portion 14 easier.

When attaching the anchor plate 10 to the floor panel 28 without fixing the pin 30 to the floor panel 28 in advance, the pin 30 may also be inserted from the back surface side of the floor panel 28, as shown in FIGS. 4A and 4B. Also, the pin 30 is not limited to a parallel pin, and may also be a tapered pin. Further, the pin 30 does not have to have the head portion 30A.

Other Example Embodiments

In the example embodiments described above, the floor panel 28 is given as an example of the mounting portion, but the mounting portion is not limited to this. The mounting portion may also be a vehicle frame member or a reinforcing member.

The alignment direction of the fastening portion 14 and the rotation-stopping portion 16 (i.e., the second axis L2) is set parallel to the direction in which the load F that is input from the lap belt 20W to the belt connecting portion 12 when a vehicle collision occurs is applied, but the alignment direction of the fastening portion 14 and the rotation-stopping portion 16 is not limited to this.

The rotation-stopping portion 16 is a structure in which the anchor plate 10 engages with a shaft member, but the rotation-stopping portion 16 is not limited to this, i.e., the rotation-stopping portion 16 may also be a structure in which the anchor plate 10 engages with another member. Also, protruding and recessed shapes that engage with each other may also be provided on the anchor plate 10 and the mounting portion. A bolt and a pin are given as examples of the shaft member, but the shaft member is not limited to these, i.e., the shaft member may also be a rivet or the like.

What is claimed is:

1. An anchor plate mounting structure of a vehicle seatbelt, comprising:
    an anchor plate that is provided on a mounting portion provided on a surrounding portion of a vehicle seat, and has a belt connecting portion to which an end portion of a lap belt of the vehicle seatbelt, the lap belt corresponding to a waist of an occupant, is fastened;
    a fastening portion that is provided in a position away from the belt connecting portion, and by which the anchor plate is fastened to the mounting portion; and
    a rotation-stopping portion that is provided in a position away from both the belt connecting portion and the fastening portion, and by which the anchor plate engages with a mounting portion side, wherein
    an alignment direction of the belt connecting portion and the fastening portion intersects with an alignment direction of the fastening portion and the rotation-stopping portion and
    a first axis that connects a center of the belt connecting portion with a center of the fastening portion is orthogonal to a second axis that connects the center of the fastening portion with a center of the rotation-stopping portion.

2. The anchor plate mounting structure according to claim 1, wherein
    the alignment direction of the fastening portion and the rotation-stopping portion is set parallel to a direction in which a load input from the lap belt to the belt connecting portion when a vehicle collision occurs is applied.

3. The anchor plate mounting structure according to claim 1, wherein
    the rotation-stopping portion is a structure in which the anchor plate engages with a shaft member inserted through the anchor plate.

4. The anchor plate mounting structure according to claim 3, wherein
    the shaft member is a bolt that fastens the anchor plate to the mounting portion.

5. The anchor plate mounting structure according to claim 3, wherein the shaft member is a pin.

6. The anchor plate mounting structure according to claim 5, wherein the pin is fixed to the mounting portion side or an anchor plate side.

7. The anchor plate mounting structure according to claim 1, wherein the anchor plate is an L-shaped metal plate.

8. The anchor plate mounting structure according to claim 7, wherein a through-hole of the belt connecting portion and a through-hole of the rotation-stopping portion are provided one on each end portion of the L-shaped anchor plate, and a through-hole of the fastening portion is provided at a bent portion of the L-shaped anchor plate.

9. The anchor plate mounting structure according to claim 1, wherein the fastening portion is offset with respect to the belt connecting portion, in an intersecting direction that intersects with a vehicle longitudinal direction.

10. The anchor plate mounting structure according to claim 9, wherein the intersecting direction is a vehicle up-and-down direction.

11. An anchor plate mounting structure of a vehicle seatbelt, comprising:

an anchor plate that is provided on a mounting portion provided on a surrounding portion of a vehicle seat, and has a belt connecting portion to which an end portion of a lap belt of the vehicle seatbelt, the lap belt corresponding to a waist of an occupant, is fastened;

a fastening portion that is provided in a position away from the belt connecting portion, and by which the anchor plate is fastened to the mounting portion; and a rotation-stopping portion that is provided in a position away from both the belt connecting portion and the fastening portion, and by which the anchor plate engages with a mounting portion side, wherein an alignment direction of the belt connecting portion and the fastening portion intersects with an alignment direction of the fastening portion and the rotation-stopping portion and the rotation-stopping portion is offset to a vehicle front side or a vehicle rear side, with respect to the fastening portion.

* * * * *